United States Patent
Kaliyamoorthy

(10) Patent No.: US 11,005,746 B1
(45) Date of Patent: May 11, 2021

(54) STACK GROUP MERGING SYSTEM

(71) Applicant: Dell Products L.P., Round Rock, TX (US)

(72) Inventor: Karthi Kaliyamoorthy, Chengalpattu (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/715,141

(22) Filed: Dec. 16, 2019

(51) Int. Cl.
*H04L 12/26* (2006.01)
*H04L 29/08* (2006.01)
*H04L 12/751* (2013.01)

(52) U.S. Cl.
CPC ............ *H04L 43/16* (2013.01); *H04L 43/062* (2013.01); *H04L 43/0876* (2013.01); *H04L 45/02* (2013.01); *H04L 67/1097* (2013.01)

(58) Field of Classification Search
CPC ... H04L 43/16; H04L 43/062; H04L 43/0876; H04L 45/02; H04L 67/1097
See application file for complete search history.

(56) References Cited

U.S. PATENT DOCUMENTS

| | | | | |
|---|---|---|---|---|
| 6,456,597 B1* | 9/2002 | Bare | ................. | H04L 29/12009 370/252 |
| 6,785,272 B1* | 8/2004 | Sugihara | ............. | H04L 41/0213 370/386 |
| 6,934,292 B1* | 8/2005 | Ammitzboell | ........ | H04L 49/354 370/395.53 |
| 7,120,683 B2* | 10/2006 | Huang | .................... | H04L 45/00 709/223 |
| 7,447,198 B1* | 11/2008 | Banks | ..................... | H04L 45/00 370/386 |
| 7,675,869 B1* | 3/2010 | Anker | .................... | H04L 49/351 370/255 |
| 7,729,296 B1* | 6/2010 | Choudhary | ............. | H04L 45/48 370/256 |
| 2006/0047809 A1* | 3/2006 | Slattery | ................. | H04L 67/025 709/224 |
| 2006/0092853 A1* | 5/2006 | Santoso | .................. | H04L 49/35 370/252 |
| 2006/0146697 A1* | 7/2006 | Magret | ................. | H04L 45/583 370/219 |
| 2006/0218222 A1* | 9/2006 | Brahmbhatt | ........ | H04L 67/1068 709/201 |
| 2006/0227735 A1* | 10/2006 | Baird | ...................... | H04L 45/02 370/327 |

(Continued)

*Primary Examiner* — Blake J Rubin
(74) *Attorney, Agent, or Firm* — Haynes and Boone, LLP

(57) ABSTRACT

A stack group merging system includes a first stack group including a first master stack device and first slave stack device(s), and a second stack group includes a second master stack device and second slave stack device(s). The first master stack device determines a first total data traffic amount transmitted by itself and the first slave stack device(s) in the first stack group. The second master stack device determines a second total data traffic amount transmitted by itself and the second slave stack device(s) in the second stack group. The first and second master stack devices exchange the first and second total data traffic amounts, and the master stack device in the stack group that transmits a higher total data traffic amount then operates as a master slave device for a merged stack group including the first and second stack group.

20 Claims, 11 Drawing Sheets

(56) References Cited

U.S. PATENT DOCUMENTS

| | | | |
|---|---|---|---|
| 2008/0301319 A1* | 12/2008 | Dernosek | H04L 12/66 709/232 |
| 2011/0016243 A1* | 1/2011 | Wu | H04L 45/70 710/110 |
| 2013/0039170 A1* | 2/2013 | Higgins | H04L 12/437 370/228 |
| 2015/0169033 A1* | 6/2015 | Shukla | G06F 1/325 713/320 |
| 2015/0249587 A1* | 9/2015 | Kozat | H04L 45/28 370/222 |
| 2015/0271076 A1* | 9/2015 | Rolette | H04L 43/0817 370/235 |
| 2015/0319646 A1* | 11/2015 | Zhou | H04L 49/70 370/237 |
| 2016/0043902 A1* | 2/2016 | Liang | H04L 12/4625 370/254 |
| 2019/0007301 A1* | 1/2019 | Kadosh | H04L 45/745 |

* cited by examiner

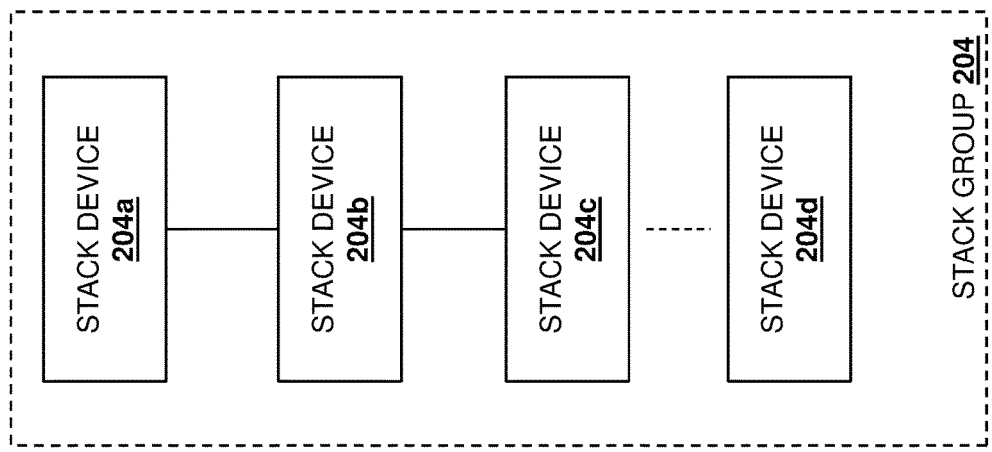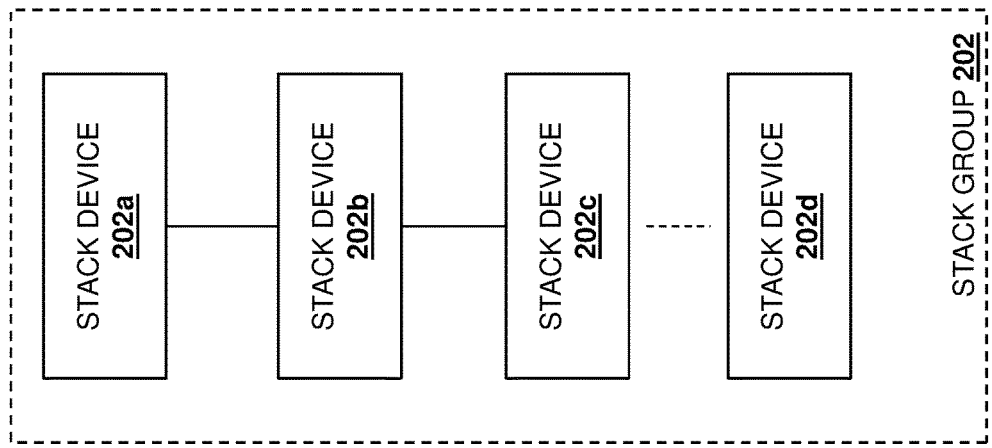
FIG. 2

STACK GROUP MERGING SYSTEM

BACKGROUND

The present disclosure relates generally to information handling systems, and more particularly to merging stack groups provided by information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices or other stack devices (also referred to as "stack units") known in the art, are sometimes provided in stack groups. As would be understood by one of skill in the art in possession of the present disclosure, a stack group may include a plurality of switch devices that have been configured to operate together as a single logical switch while having port capacity and other combined resources of the group of switch devices. In such stack groups, each of the stack devices may be provided a priority that allows a master stack device to be elected, with each of the remaining stack devices in that stack group operating as slave stack devices. For example, the stack device elected as the master stack device may have been provided a higher priority value than the stack device(s) that operate as slave stack device(s). However, in another example, more than one of the stack devices in the plurality of stack devices may have the same highest priority value, and the Media Access Control (MAC) address of those stack devices may be utilized to elect the master stack device (e.g., the stack device with the "highest" MAC address may be elected as the master stack device.) Following the election of the master stack device, the stack group may be configured with interface IP address(es), interface Virtual Local Area Network (VLAN) IP address(es), Layer 3 (L3) configurations, aggregation or "trunking" configurations, and/or other stack group configurations that would be apparent to one of skill in the art in possession of the present disclosure in order to allow the stack devices in the stack group to transmit data traffic between computing devices coupled to the stack group.

However, in some situations different stack groups may be combined and/or otherwise merged together into a merged stack group, and the merging of stack groups can raise issues. As discussed above, each stack group will include a master stack device that was elected for that stack group, and the merging of those stack groups will require that one of those master stack devices be elected as the master stack device of the merged stack group. Conventional stack group merging systems operate to elect the master stack device for the merged stack group in substantially the same manner as described above, with the master stack devices in the respective stack groups comparing their priorities to elect the master stack device with the higher priority as the master stack device for the merged stack group, and in the event that the master stack devices have the same priority, the master stack devices in the respective stack groups compare their MAC addresses to elect the master stack device with the "highest" MAC address as the master stack device for the merged stack group. As will be recognized by one of skill in the art in possession of the present disclosure, in most stack group deployments, the priority values assigned to the stack device do not change prior to stack group merging operations.

Thus, in situations where the master stack devices in the different stack groups have the same priority, the use of the MAC addresses of those master stack devices may result in the master stack device for the stack group that handles a relatively lower data traffic amount than the other stack group including the master stack device that is being elected as the master stack device for the merged stack group, as conventional stack group merging systems do not take into account the amount of data traffic being transmitted by the different stack groups being merged. As a result, the stack group that handled a relatively higher data traffic amount will reboot and lose its configuration, then be configured by the master stack device for the merged stack group with the configuration of the stack group that was previously handling the relatively lower data traffic amount prior to the merging of the stack groups, which can result in a loss of data traffic that was previously being handled by the stack group being reconfigured, and requires manual reconfiguration by a user or administrator of the merged stack group if it is to handle that data traffic which was being handling prior to the merging of the stack groups. As will be appreciated by one of skill in the art in possession of the present disclosure, as the number of stack devices included in the stack group being reconfigured subsequent to the merging grows, the amount of time and the number or errors associated with that reconfiguration grows as well, which delays and may even prevent the subsequent transmission of the relatively higher data traffic amount that stack group was previously handling.

Accordingly, it would be desirable to provide a stack group merging system that addresses the issues discussed above.

SUMMARY

According to one embodiment, an Information Handling System (IHS) includes a communications system; a processing system that is coupled to the communications system; and a memory system that is coupled to the processing system and that includes instructions that, when executed by the processing system, cause the processing system to provide a stack group merging engine that is configured to: identify respective first data traffic amounts transmitted via the communications system and by at least one first slave stack device that is coupled to the communications system; determine, using the respective first data traffic amounts, a first total data traffic amount transmitted by a first stack group; receive, from a second master stack device in a second stack group, a first stack merging communication that identifies a second total data traffic amount transmitted by the second stack group; and determine that the first total data traffic amount is greater than the second total data traffic amount and, in response, operate as a master stack device for a merged stack group that includes the first stack group and the second stack group.

BRIEF DESCRIPTION OF THE DRAWINGS

FIG. 2 is a schematic view illustrating an embodiment of a stack group merging system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
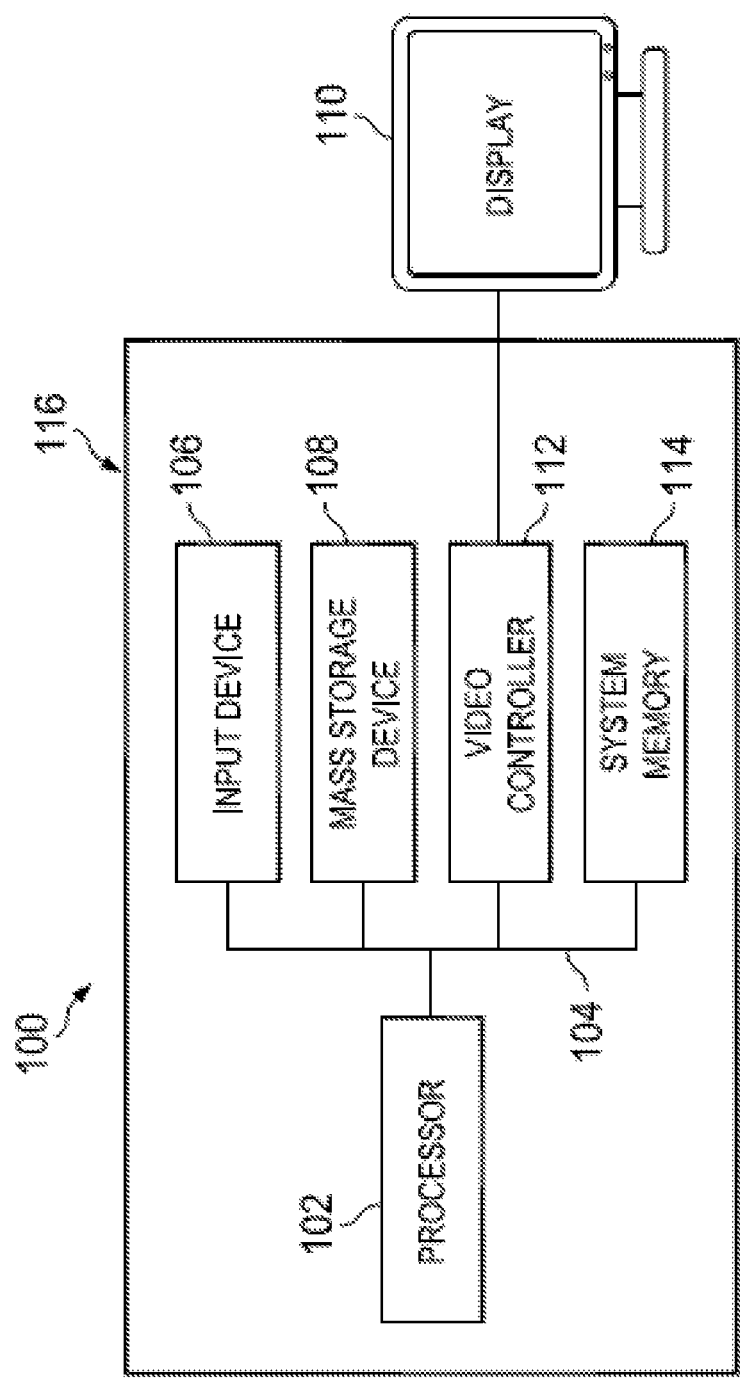
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Referring now to FIG. 2, an embodiment of a stack group merging system 200 is illustrated. In the illustrated embodiment, the stack group merging system 200 incudes a plurality of stack device 202*a*, 202*b*, 202*c*, and up to 202*d* that, as discussed below, may be provided in a stack group 202. In the illustrated embodiment, the stack group merging system 200 also incudes a plurality of stack device 204*a*, 204*b*, 204*c*, and up to 204*d* that, as discussed below, may be provided in a stack group 204. In an embodiment, any or all of the stack devices 202*a*-202*d* and 204*a*-204*d* may be provided by the IHS 100 discussed above with reference to FIG. 1, and/or may include some or all of the components of the IHS 100, and in specific examples may be provided by networking devices such as switch devices. However, while illustrated and discussed as provided by switch devices, one of skill in the art in possession of the present disclosure will recognize that stack devices provided in the stack group merging system 200 may include any devices that may be configured to operate similarly as the stack devices 202*a*-202*d* and 204*a*-204*d* discussed below. Furthermore, while not illustrated, one of skill in the art in possession of the present disclosure will recognize that any or all of the stack devices 202*a*-202*d* and 204*a*-204*d* may be connected and/or coupled to computing devices and configured to transmit data traffic between those computing devices. However, while a specific stack group merging system 200 has been illustrated and described, one of skill in the art in possession of the present disclosure will recognize that the stack group merging system of the present disclosure may include a variety of components and component configurations while remaining within the scope of the present disclosure as well.

Figure 3:
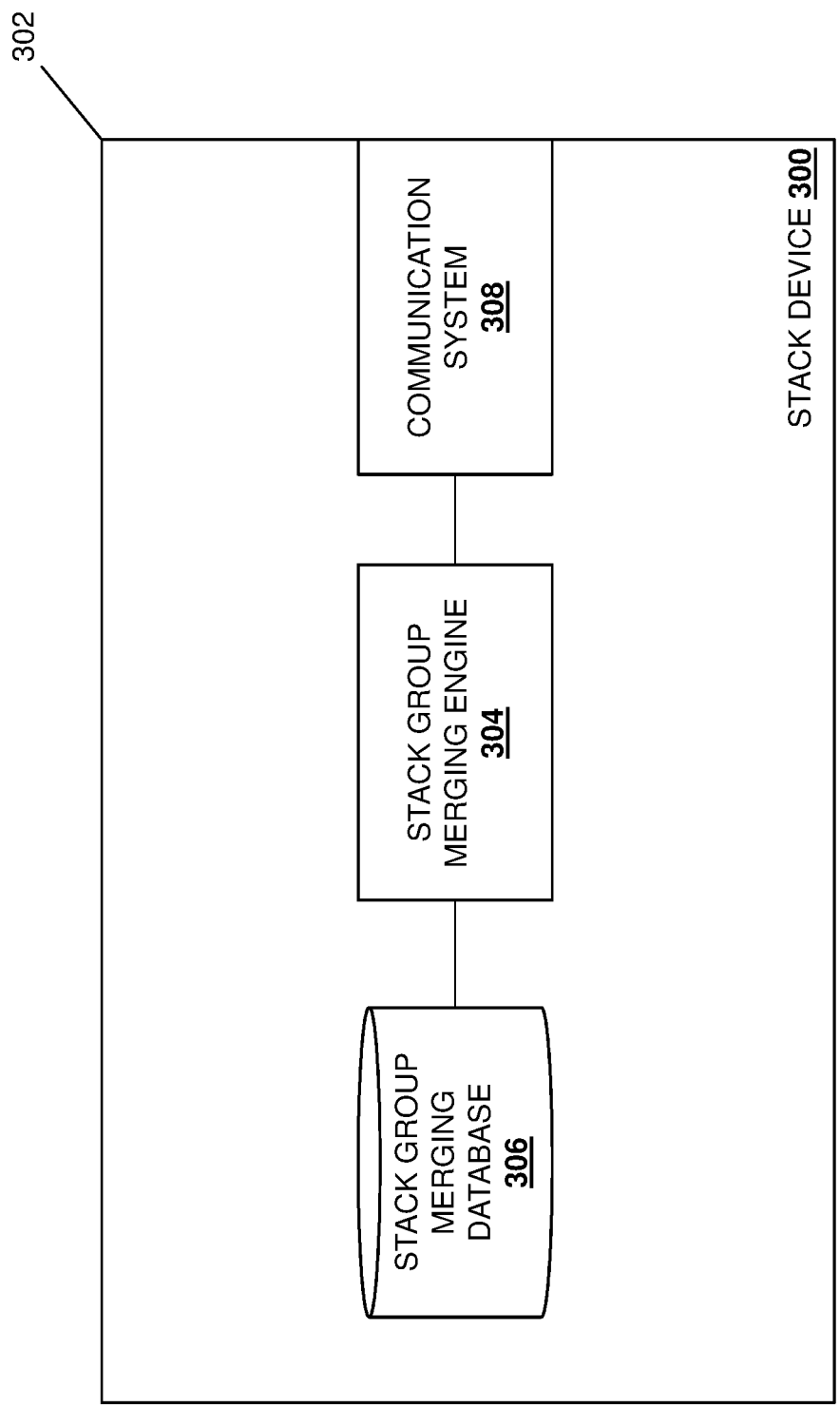
FIG. 3 is a schematic view illustrating an embodiment of a stack device that may be provided in the stack group merging system of FIG. 2.

Referring now to FIG. 3, an embodiment of a stack device 300 is illustrated that may provide any or all of the stack devices 202*a*-202*d* and 204*a*-204*b* discussed above with reference to FIG. 2. As such, the stack device 300 may be provided by the IHS 100 discussed above with reference to FIG. 1 and/or may include some or all of the components of the IHS 100, and in specific examples may be provided by a switch device. Furthermore, while illustrated and discussed as being provided by a switch device, one of skill in the art in possession of the present disclosure will recognize that the functionality of the stack device 300 discussed below may be provided by other devices that are configured to operate similarly as the stack device 300 discussed below. In the illustrated embodiment, the stack device 300 includes a chassis 302 that houses the components of the stack device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a stack group merging engine 304 that is configured to perform the functionality of the stack group merging engines and/or stack devices discussed below.

The chassis 302 may also house a storage system (not illustrated, but which may include the storage 108 discussed above with reference to FIG. 1) that is coupled to the stack group merging engine 304 (e.g., via a coupling between the storage system and the processing system) and that includes a stack group merging database 306 that is configured to store any of the information utilized by the stack group merging engine 304 discussed below. The chassis 302 may also house a communication system 308 that is coupled to the stack group merging engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As such, the communication system 308 may include the port(s) on the stack device 300 that as discussed below may be utilized to transmit data traffic. While a specific stack device 300 has been illustrated, one of skill in the art in possession of the present disclosure will recognize that stack devices (or other devices operating according to the teachings of the present disclosure in a manner similar to that described below for the stack device 300) may include a variety of components and/or component configurations for providing conventional switch/stack device functionality, as well as the functionality discussed below, while remaining within the scope of the present disclosure as well.

Figure 4:
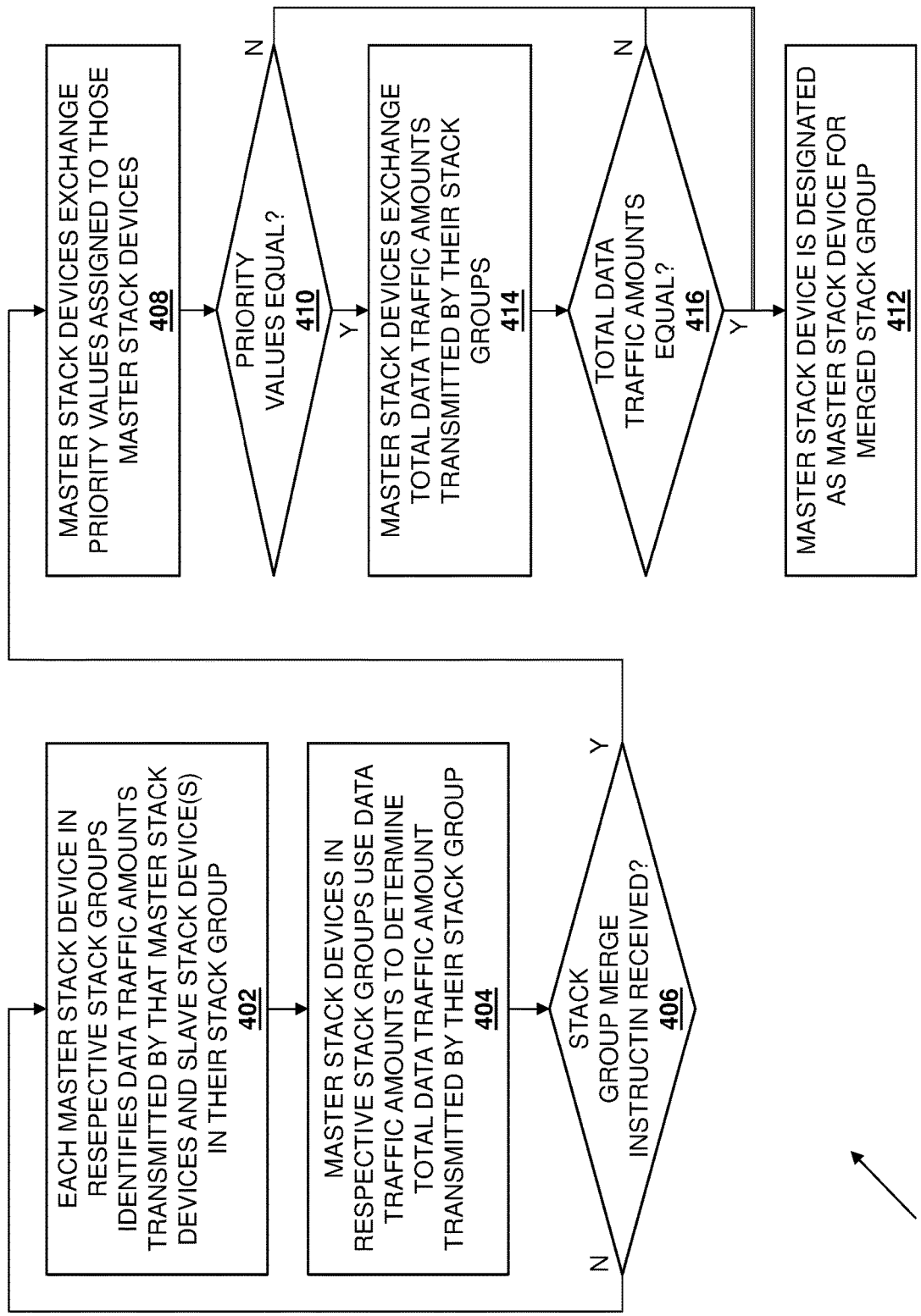
FIG. 4 is a flow chart illustrating an embodiment of a method for merging stack groups.

Referring now to FIG. 4, an embodiment of a method 400 for merging stack groups is illustrated. As discussed below, the systems and methods of the present disclosure provide for the merging of stack groups based on which stack group was transmitted the higher amount of data traffic prior to merging. For example, a first stack group may include a first master stack device and slave stack device(s), with the first master stack device identifying respective first data traffic amounts transmitted by itself and the slave stack device(s), and using those respective first data traffic amounts to determine a first total data traffic amount transmitted by the first stack group. The first master stack device may then transmit a first stack merging communication that identifies the first total data traffic amount to a second stack master device that is included in a second stack group with second slave stack device(s). The second stack master device may also identify respective second data traffic amounts transmitted by itself and the second slave stack device(s), and use those respective second data traffic amounts to determine a second total data traffic amount transmitted by the second stack group. Upon receiving the first stack merging communication that identifies the first total data traffic amount from the first master stack device, the second master stack device may determine that the second total data traffic amount is greater than the first total data traffic amount and, in response, operate as a master stack device for a merged stack group that includes the first stack group and the second stack group. As such, the merging of stack groups in response to a stack group merging instruction may include the election of a master stack device from the one of those stacks groups that was previously transmitting the higher amount of data traffic, thus providing the merged stack group the configuration of the stack group that was previously transmitting the higher amount of data traffic, and assuring that any interruption in the transmission of data traffic due to the need to reconfigure a stack group will occur to the data traffic transmitted by the stack group that was previously transmitting the lower amount of data traffic.

In an embodiment, during or prior to the method 400, stack groups may be formed having two or more stack devices. For example, with reference to the stack group merging system 200 of FIG. 2 and the embodiment of that stack group merging system 200 illustrated in FIG. 5, the stack devices 202a-202d may be configured as part of the stack group 202, and the stack devices 204a-204d may be configured as part of the stack group 204. As would be appreciated by one of skill in the art in possession of the present disclosure, the configuration of a stack group may include each of the stack devices 202a-202d and 204a-204d having been previously configured with a priority value that is utilized to elect one of the stack devices 202a-202d as the master stack device in the stack group 202, and elect one of the stack devices 204a-204d as the master stack device in the stack group 204. For example, a user or administrator of the stack group merging system 200 may set a priority value for one or more of the stack devices 202a-202d and 204a-204d in order to identify which of those stack devices should be elected as a master stack device of any subsequent stack group, or may simply allow the default priority values for each of the stack devices 202a-202d and 204a-204d to be used to identify which of those stack devices should be elected as a master stack device of any subsequent stack group.

Figure 5:
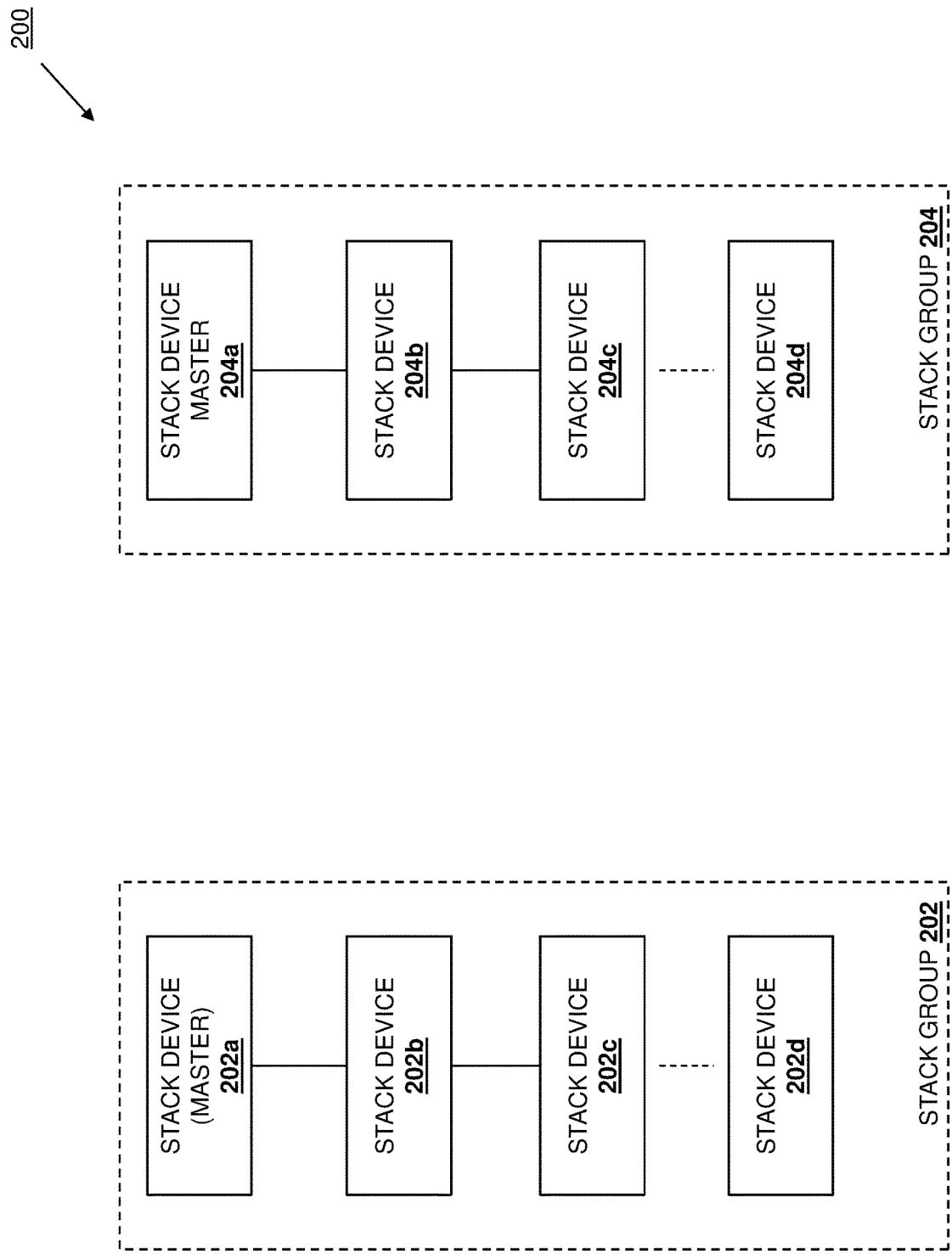
FIG. 5 is a schematic view illustrating an embodiment of the stack group merging system of FIG. 2 during the method of FIG. 4.

In some embodiments, FIG. 5 may illustrate a situation where the user or administrator of the stack group merging system 200 may have set a priority value for the stack device 202a higher than the stack devices 202b-202d such that the stack device 202a was elected as the master stack device 202a of the stack group 202, and may have set a priority value for the stack device 204a higher than the stack devices 204b-204d such that the stack device 204a was elected as the master stack device 204a of the stack group 204. In other embodiments, FIG. 5 may illustrate a situation where the user or administrator of the stack group merging system 200 may have allowed the default priority values of the stack devices 202b-202d to be utilized for stack group formation such that the stack device 202a was elected as the master stack device 202a of the stack group 202, and may have allowed the default priority values of the stack devices 204b-204d to be utilized for stack group formation such that the stack device 204a was elected as the master stack device 204a of the stack group 204. While not explicitly illustrated, one of skill in the art in possession of the present disclosure will recognize that the election of the master stack device 202a in the stack group 202 will cause the stack devices 202b-202d to operate as slave stack devices in the stack group 202, and the election of the master stack device 204a in the stack group 204 will cause the stack devices 204b-204d to operate as slave stack devices in the stack group 204.

As will be appreciated by one of skill in the art in possession of the present disclosure, the use of default priority values to elect a master stack device may include the stack device 202a and 204a having default priority values that are the same as one or more the other stack devices 202b-202d and 204b-204d, respectively, in their stack groups 202 and 204, respectively, which may provide for the use of the MAC addresses of those stack devices 202a-202d and 204a-204d (i.e., stack devices assigned the same priority values) to identify that the stack devices 202a and 204a should be elected as a master stack device of their respective stack groups 202 and 204 (e.g., based on each of the stack devices 202a and 204a having a "higher" MAC addresses than the other stack devices 202b-202d and 204b-204d, respectively, in their stack groups 202 and 204, respectively, that have been assigned an equal priority value.) However, the use of default priority value to elect a master stack device may also include the stack device 202a and 204a having default priority values that are higher then the other stack devices 202b-202d and 204b-204d, respectively, in their stack groups 202 and 204, respectively, while remaining within the scope of the present disclosure as well.

Furthermore, the configuration of the master stack device 202a and the stack devices 202b-202d in the stack group 202 that operate as slave stack devices may also include a variety of configuration operations on the stack devices 202a-202d in the stack group 202, including interface IP address configuration operations on or associated with interfaces included on the stack devices 202a-202d, interface Virtual Local Area Network (VLAN) IP address configuration operations on or associated with interfaces included on the stack devices 202a-202d, Layer 3 (L3) configuration operations on or associated with interfaces included on the stack devices 202a-202d, aggregation or "trunking" configuration operations on or associated with interfaces included on the stack devices 202a-202d, and/or other stack group configuration operations that would be apparent to one of skill in the art in possession of the present disclosure. As discussed above, while not explicitly illustrated, one of skill in the art in possession of the present disclosure will appreciate that one or more of the stack devices 202a-202d in the stack group 202 may be coupled to a variety of computing devices, and the configuration operations performed on the stack devices 202a-202d in the stack group 202 may include any configuration operations that operate to allow the stack devices 202a-202d in the stack group 202 to transmit data traffic between those computing devices.

Similarly, the configuration of the master stack device 204a and the stack devices 204b-204d in the stack group 204 that operate as slave stack devices may also include a variety of configuration operations on the stack devices 204a-204d in the stack group 204, including interface IP address configuration operations on or associated with interfaces included on the stack devices 204a-204d, interface Virtual Local Area Network (VLAN) IP address configuration operations on or associated with interfaces included on the stack devices 204a-204d, Layer 3 (L3) configuration operations on or associated with interfaces included on the stack devices 204a-204d, aggregation or "trunking" configuration operations on or associated with interfaces included on the stack devices 204a-204d, and/or other stack group configuration operations that would be apparent to one of skill in the art in possession of the present disclosure. As discussed above, while not explicitly illustrated, one of skill in the art in possession of the present disclosure will appreciate that one or more of the stack devices 204a-204d in the stack group 204 may be coupled to a variety of computing devices, and the configuration operations performed on the stack devices 204a-204d in the stack group 204 may include any configuration operations operate to allow the stack devices 204a-204d in the stack group 204 to transmit data traffic between those computing devices. Furthermore, any configuration information associated with the configurations of the stack groups 202 and 204 may be stored in the stack group merging databases 306 in any or all of the stack devices 202a-202d and/or 204a-204d.

The method 400 begins at block 402 where each master stack devices in respective stack groups identifies data traffic amounts transmitted by those master stack devices and slave stack device(s) in their stack groups. In an embodiment, at block 402, the stack group merging engine 304 in the master stack devices 202a and 204a in the stack groups 202 and 204, respectively, may operate to identify data traffic amounts transmitted by themselves and the stack devices 202b-202d and 204b-204d, respectively, that are operating as slave stack devices in their respective stack groups 202 and 204. For example, the stack group merging engine 304 in the master stack device 202a/300 may operate at block 402 to identify the data traffic being transmitted via each of the ports included in its communication system 308, and may also identify the data traffic being transmitted via each of the ports included in the communication system 308 in each respective stack device 202b-202d/300 operating as a slave stack device for the stack group 202. In a specific example, a "stack traffic measuring" agent may be provided (e.g., via software and/or hardware) on each of the stack devices 202b-202d and 204b-204d, respectively, that are operating as slave stack devices in their respective stack groups 202 and 204, and may operate to measure and/or poll the traffic details for each respective interface on that that stack device, and then transmit that results of that measuring and/or polling to the master stack device in its stack group (e.g., via Inter-Process Communications (IPC)).

In a specific example, at block 402, the stack group merging engine 304 in the master stack device 202a/300 may identify that there are 48 ports in its communication system 308, and that each of those ports are transmitting a maximum of 1 Gigabit per second (Gbps) of data traffic over a time period for a total of 48 Gbps of data traffic being transmitted by the master stack device 202a over that time period. Similarly, at block 402, the stack group merging engine 304 in the master stack device 202a/300 may identify that there are 24 ports in the communication system 308 on the stack device 202b, with 12 of those ports transmitting a maximum of 2 Gbps of data traffic over the time period being measured and 12 of those ports transmitting 1.25 Gbps of data traffic over that time period for a total of 39 Gbps of data traffic being transmitted by the stack device 202b over the time period being measured. One of skill in the art in possession of the present disclosure will appreciate how the total data traffic being transmitted by the stack devices 202c and 202d (e.g., 30 Gbps and 40.5 Gbps over the time period(s) being measured in the example provided below) may be determined in a similar manner as well. In some embodiments, the time period being used to measure the data traffic being transmitted by the stack devices 202a-202d in the example above may be the same time period (e.g., at the same time and/or over the same amount of time). However, one of skill in the art in possession of the present disclosure will recognize that different time periods (e.g., at different times and/or over different amounts of time) may be used to measure the data being transmitted by the stack devices 202a-202d in the example above while remaining within the scope of the present disclosure.

Similarly, the stack group merging engine 304 in the master stack device 204a/300 may operate at block 402 to identify the data traffic being transmitted via each of the ports included in its communication system 308, and may also identify the data traffic being transmitted via each of the ports included in the communication system 308 in each respective stack device 204b-204d/300 operating as a slave stack device for the stack group 204. In a specific example, at block 402, the stack group merging engine 304 in the master stack device 204a/300 may identify that there are 36 ports in its communication system 308, and that each of those ports are transmitting a maximum of 0.5 Gbps of data traffic over a time period for a total of 18 Gbps of data traffic being transmitted by the master stack device 204a over that time period. Similarly, at block 402, the stack group merging engine 304 in the master stack device 204a/300 may identify that there are 20 ports in the communication system 308 on the stack device 204b, with 5 of those ports transmitting a maximum of 1 Gbps of data traffic over the time period and 15 of those ports transmitting 0.3 Gbps of data traffic over that time period for a total of 9.5 Gbps of data traffic being transmitted by the stack device 204b over that time period. One of skill in the art in possession of the present disclosure will appreciate how the total data traffic being transmitted by the stack devices 204c and 204d (e.g., 5 Gbps and 22.3 Gbps in the example provided below) may be determined in a similar manner as well.

In some embodiments, the time period being used to measure the data traffic being transmitted by the stack devices 204a-204d in the example above may be the same time period (e.g., at the same time and/or over the same amount of time). However, one of skill in the art in possession of the present disclosure will recognize that different time periods (e.g., at different times and/or over different amounts of time) may be used to measure the data being transmitted by the stack devices 204a-204d in the example above while remaining within the scope of the present disclosure. Similarly, in some embodiments, the time period being used to measure the data traffic being transmitted by the stack devices 202a-202d and the stack devices 204a-204d in the examples above may be the same time period (e.g., at the same time and/or over the same amount of time). However, one of skill in the art in possession of the present disclosure will recognize that different time periods (e.g., at different times and/or over different amounts of time) may be used to measure the data being transmitted by the stack devices 202a-202d and the stack devices 204a-204d in the examples above while remaining within the scope of the present disclosure. Furthermore, in some embodiments, the data traffic amounts measured at block 402 may be identified by actual data traffic flow measurements on the ports in the stack devices, which one of skill in the art in possession of the present disclosure will recognize may be performed repeatedly and/or periodically to measure dynamic data traffic flow amounts that change regularly.

The method 400 then proceeds to block 404 where the master stack devices in the respective stack groups use the data traffic amounts to determine a total data traffic amount transmitted by their stack group. In an embodiment, at block 404, the stack group merging engine 304 in the master stack devices 202a and 204a in the stack groups 202 and 204, respectively, may operate to use the data traffic amounts identified at block 402 to determine the total data traffic amount being transmitted by their respective stack groups 202 and 204. For example, the stack group merging engine 304 in the master stack device 202a/300 may operate at block 402 to use the total data traffic amounts being transmitted via each of the ports included in its communication system 308, and the total data traffic amounts being transmitted via each of the ports included in the communication system 308 in each respective stack device 202b-202d/300 operating as a slave stack device for the stack group 202, to determine a total data traffic amount being transmitted by the stack group 202. As such, continuing with the specific example provided above, at block 402 the stack group merging engine 304 in the master stack device 202a/300 may determine that the stack group 202 is transmitting a total of (48 Gbps+39 Gbps+30 Gbps+40.5 Gbps=) 157.5 Gbps of data traffic over the time period in which it was measured.

Similarly, the stack group merging engine 304 in the master stack device 204a/300 may operate at block 402 to use the total data traffic amounts being transmitted via each of the ports included in its communication system 308, and the total data traffic amounts being transmitted via each of the ports included in the communication system 308 in each respective stack device 204b-204d/300 operating as a slave stack device for the stack group 204, to determine a total data traffic amount being transmitted by the stack group 204. As such, continuing with the specific example provided above, at block 402 the stack group merging engine 304 in the master stack device 204a/300 may determine that the stack group 204 is transmitting a total of (18 Gbps+9.5 Gbps+5 Gbps+22.3 Gbps=) 54.8 Gbps of data traffic over the time period in which it was measured. Similarly as discussed above, in some embodiments, the time period being used to measure the data traffic being transmitted by the stack devices 202a-202d and the stack devices 204a-204d in the examples above may be the same time period (e.g., at the same time and/or over the same amount of time), and thus the total data traffic being transmitted by the stack groups 202 and 204 may be over the same time period as well. However, as also discussed above, one of skill in the art in possession of the present disclosure will recognize that different time periods (e.g., at different times and/or over different amounts of time) may be used to measure the data being transmitted by the stack devices 202a-202d and the stack devices 204a-204d in the examples above while remaining within the scope of the present disclosure, and thus the total data traffic being transmitted by the stack groups 202 and 204 may be over different time periods as well.

Figure 6:
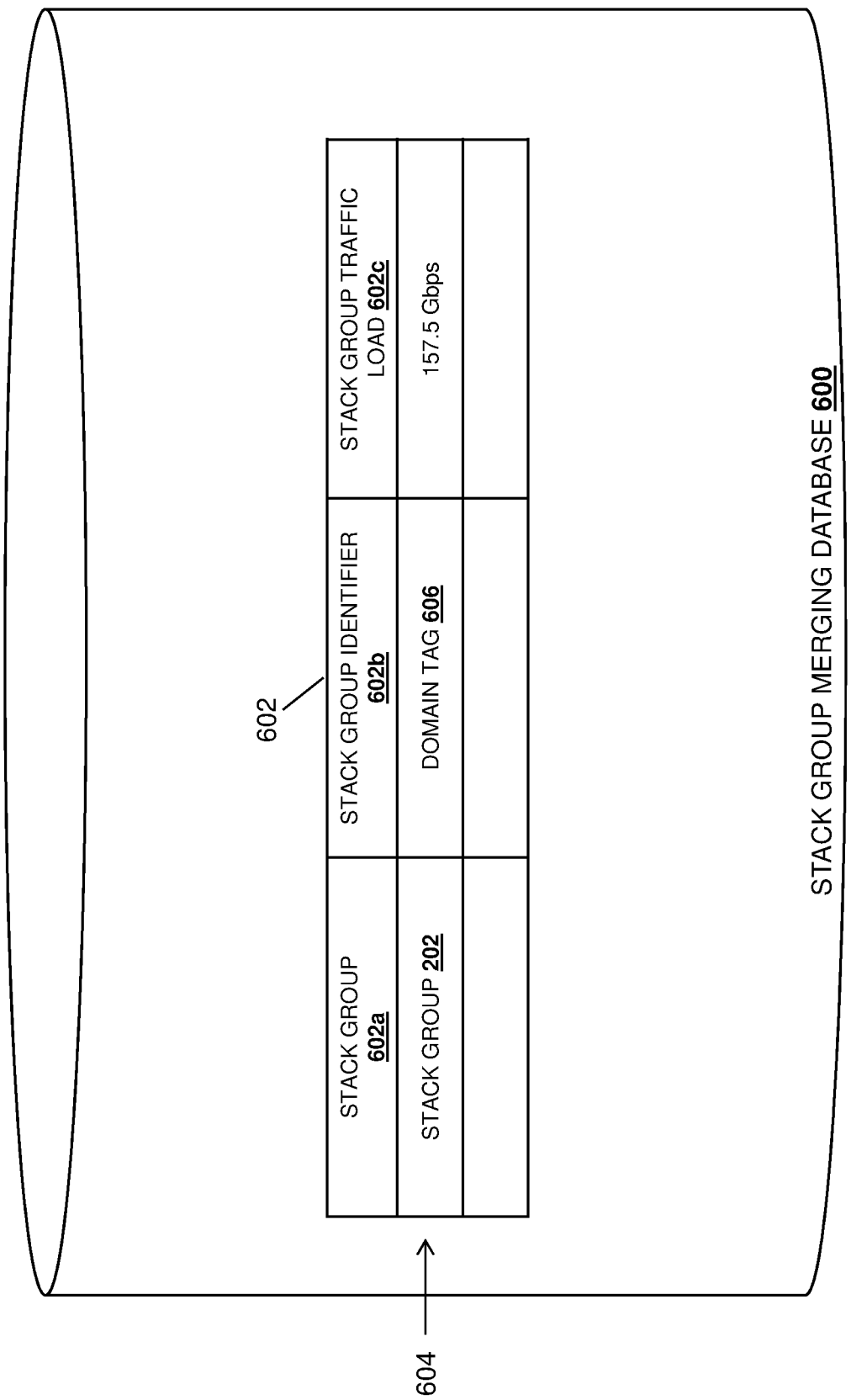
FIG. 6 is a schematic view illustrating an embodiment of a stack group merging database that may be provided during the method of FIG. 4.

With reference to FIG. 6, an embodiment of the stack group merging database 306/600 in the master stack device 202a/300 is illustrated following the performance of block 404. As can be seen, the stack group merging database 600 includes a stack group merging table 602 including a stack group column 602a, a stack group identifier column 602b, and a stack group traffic load column 602c. In an embodiment, following the performance of block 404, the stack group merging engine 304 in the master stack device 202a/300 may provide a row 604 in the stack group merging table 602 that identifies the stack group 202 in the stack group column 602a, that includes a domain tag 606 in the stack group identifier column 602b that may be generated from an identifier for the stack group 202 (e.g., its MAC address), and that identifies the total data traffic amount transmitted by the stack group 202 over the time period as discussed above with regard to block 404 (e.g., "157.5 Gbps" in the illustrated example.)

Figure 7:
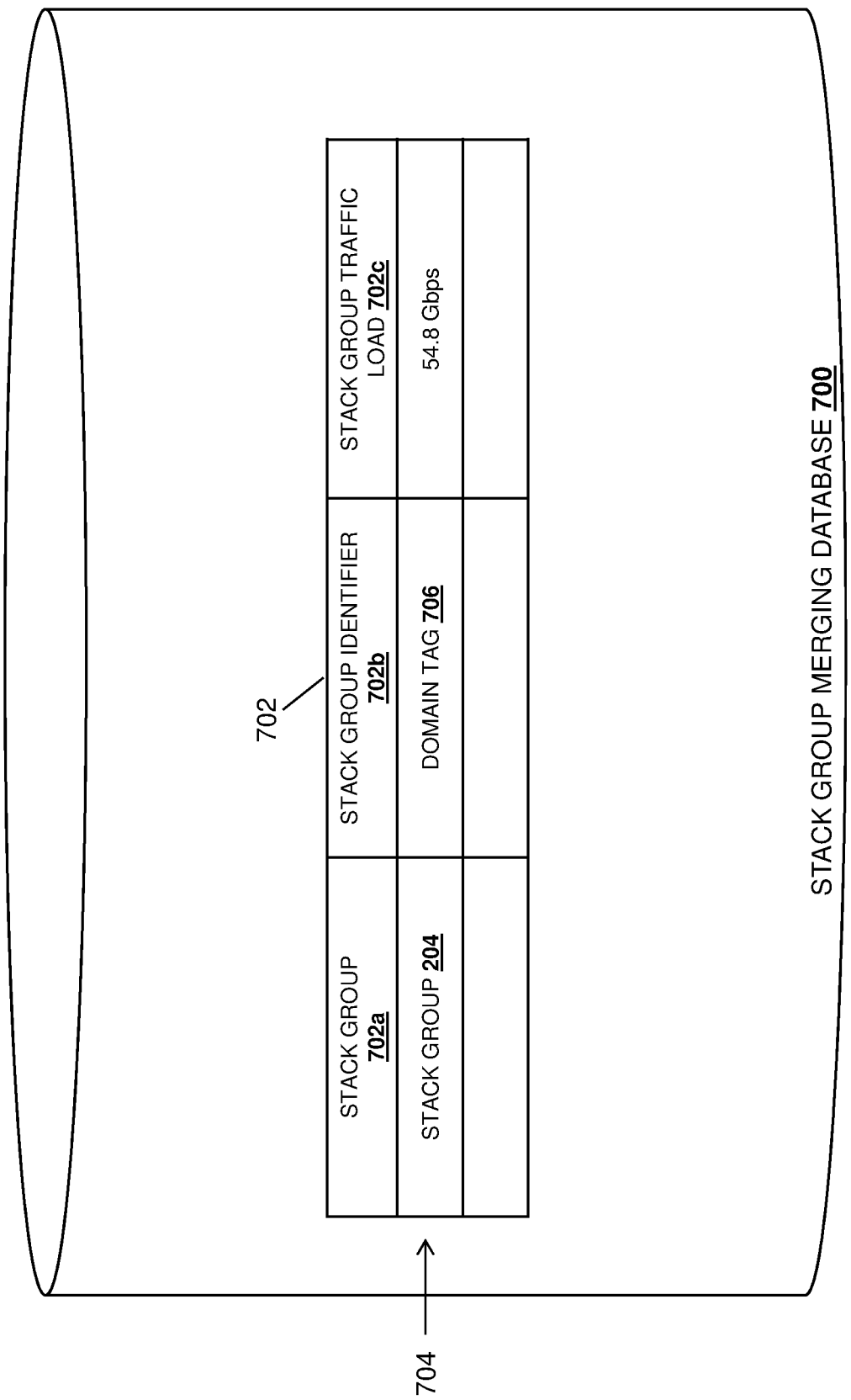
FIG. 7 is a schematic view illustrating an embodiment of a stack group merging database that may be provided during the method of FIG. 4.

Similarly, with reference to FIG. 7, an embodiment of the stack group merging database 306/700 in the master stack device 204a/300 is illustrated following the performance of block 404. As can be seen, the stack group merging database 700 includes a stack group merging table 702 including a stack group column 702a, a stack group identifier column 702b, and a stack group traffic load column 702c. In an embodiment, following the performance of block 404, the stack group merging engine 304 in the master stack device 204a/300 may provide a row 704 in the stack group merging table 702 that identifies the stack group 204 in the stack group column 702a, that includes a domain tag 706 in the stack group identifier column 702b that may be generated from an identifier for the stack group 204 (e.g., its MAC address), and that identifies the total data traffic amount transmitted by the stack group 204 over the time period as discussed above with regard to block 404 (e.g., "54.8 Gbps" in the illustrated example.)

The method 400 then proceeds to decision block 406 where it is determined whether a stack group merge instruction has been received. In an embodiment, at decision block 406, the stack group merging engine 304 in the master stack devices 202a and 204a may operate to determine whether an instruction has been received to merge their respective stack groups 202 and 204 with another stack group. As discussed below, a user or administrator of the stack group merging system 200 may couple the stack groups 202 and 204 together and provide an instruction to merge the stack groups 202 and 204, and one of skill in the art in possession of the present disclosure will recognize how the stack group merging engine 304 in the master stack devices 202a and 204a may operate to monitor for such stack group merging instructions. If, at decision block 406, it is determined that no stack group merge instruction has been received, the method 400 returns to block 402. As such, the method 400 may loop through blocks 402, 404, and 406 such that the master stack devices 202a and 204a determine the data traffic amounts being transmitted by themselves and the slave stack devices in their respective stack groups 202 and 204, determine a total data traffic amount being transmitted by their respective stack groups, and update their stack group merging databases as discussed above as long as no stack group merge instruction has been received.

Figure 8:
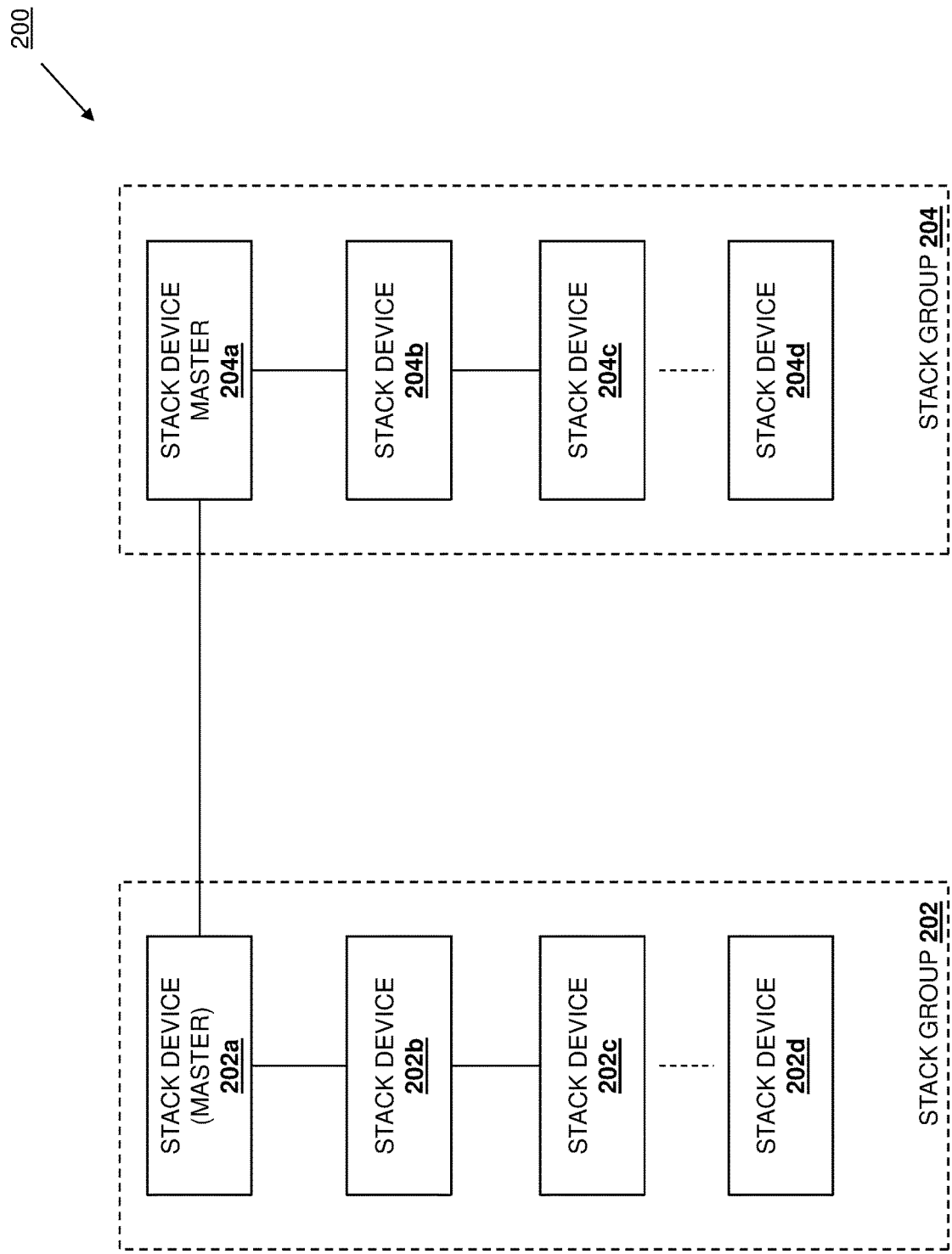
FIG. 8 is a schematic view illustrating an embodiment of the stack group merging system of FIG. 2 during the method of FIG. 4.
Figure 9:
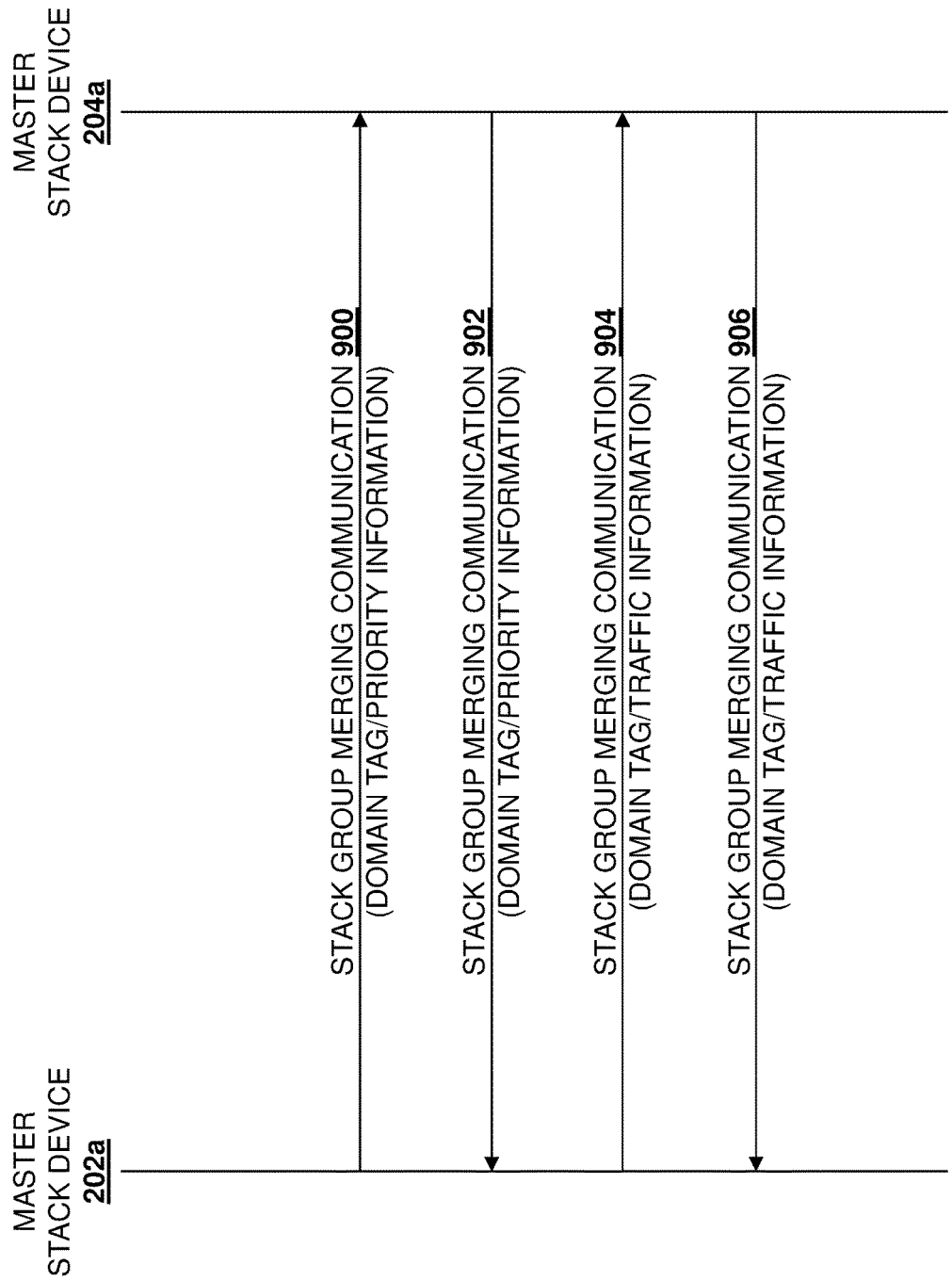
FIG. 9 is a swim-lane diagram illustrating an embodiment of stack group merging communications between master stack devices in stack groups in the stack group merging system of FIG. 2 during the method of FIG. 4.

If at decision block 406, it is determined that a stack group merge instruction has been received, the method 400 proceeds to block 408 where the master stack devices exchange priority values assigned to those master stack devices. With reference to FIG. 8, as discussed above, a user or administrator of the stack group merging system 200 may couple the master stack device 202a in the stack group 202 to the master stack device 204a in the stack group 204, and provide a stack group merge instruction to the master stack devices 204a and/or the master stack device 204b to merge the stack groups 202 and 204. As such, in an embodiment of block 408 and in response to receiving the stack group merge instruction, the stack group merging engine 304 in the master stack devices 202a and 204a may operate to exchange priority values assigned to those master stack devices 204a and 204b. With reference to FIG. 9, the stack group merging engine 304 in the master stack device 202a/300 may operate to transmit a stack group merging communication 900 via its communication system 308 to the master stack device 204a, with that stack group merging communication 900 including the domain identifier for its stack group 202, priority information associated with that master stack device 202a (e.g., including the priority value assigned to that master stack device 202a as discussed above), and/or any other stack group merging information that would be apparent to one of skill in the art in possession of the present disclosure. As such, at block 408, the stack group merging engine 304 in the master stack device 204a/300 may receive the stack group merging communication 900 via its communication system 308 from the master stack device 202a.

With continued reference to FIG. 9, in response to receiving the stack group merging communication 900, the stack group merging engine 304 in the master stack device 204a/300 may operate to transmit a stack group merging communication 902 via its communication system 308 to the master stack device 202a, with that stack group merging communication 902 including the domain identifier for its stack group 204, priority information associated with that master stack device 204a (e.g., including the priority value assigned to that master stack device 204a as discussed above), and/or any other stack group merging information that would be apparent to one of skill in the art in possession of the present disclosure. As such, at block 408, the stack group merging engine 304 in the master stack device 202a/300 may receive the stack group merging communication 902 via its communication system 308 from the master stack device 204a.

The method 400 then proceeds to decision block 410 where it is determined whether the priority values assigned to the master stack devices are equal. In an embodiment, at decision block 410, the stack group merging engine 304 in the master stack devices 202a and 204a may operate to determine whether the priority values assigned to the master stack devices 202a and 204a are equal by comparing the priority value assigned to that master stack device to the priority value received from the other master stack device. If, at decision block 410, it is determined that the priority values assigned to the master stack devices are not equal, the method 400 proceeds to block 412 where a master stack device is designated as the master stack device for a merged stack group. In this embodiment of block 412, one of master stack devices 202a and 204a has been assigned a priority value that is higher than the other master stack device and, in response, each of the stack group merging engines 304 in the master stack devices 202a and 204a will determine that the master stack device assigned the higher priority value should be elected as the master stack device of a merged stack group that includes the stack groups 202 and 204.

For example, the master stack device 202a may have been assigned a higher priority value than the master stack device 204a, and thus each of the stack group merging engines 304 in the master stack devices 202a and 204a will determine that the master stack device 202a should be elected as the master stack device of a merged stack group that includes the stack groups 202 and 204. As such, the stack group merging engine 304 in the master stack device 202a/300 will begin operating as the master stack device for a merged stack group that includes the stack groups 202 and 204, with the stack devices 204a-204d in the stack group 204 subsequently rebooting, merging with the stack group 202 (e.g., if the stack devices 202a-202d are numbered "0", "1", "2", and "3", the stack devices 204a-204d will be renumbered "4", "5", "6", and "7"), and being configured with the configuration of the stack group 202 (e.g., by the master stack device 202a.) As will be appreciated by one of skill in the art in possession of the present disclosure, the use of priority values to elect a master stack device for a merged stack group from respective master stack devices in the respective stack groups being merged is a conventional operation, and thus this embodiment of block 412 may include other conventional priority-value-based master stack device election operations that would be apparent to one of skill in the art in possession of the present disclosure.

If, at decision block 410, it is determined that the priority values assigned to the master stack devices are equal, the method 400 proceeds to block 414 where the master stack devices exchange the total data traffic amounts transmitted by their stack groups. In an embodiment as block 414 and in response to the stack group merging engines 304 in the master stack devices 202*a* and 204*a* determining that the master stack devices 202*a* and 204*a* have been assigned the same priority values, the stack group merging engines 304 in the master stack devices 202*a* and 204*a* may operate to exchange the total data traffic amount transmitted by their respective stack groups 202 and 204. With reference to FIG. 9, the stack group merging engine 304 in the master stack device 202*a*/300 may operate to transmit a stack group merging communication 904 via its communication system 308 to the master stack device 204*a*, with that stack group merging communication 904 including the domain identifier for its stack group 202, traffic information associated with the total data traffic amount transmitted by its stack group 202, and/or other stack group merging information that would be apparent to one of skill in the art in possession of the present disclosure. In a specific example, the stack group merging communication 904 may be a Topology Change Notification Packet (TCNP), although other techniques for providing the stack group merging communication 904 will fall within the scope of the present disclosure as well.

Figure 10:
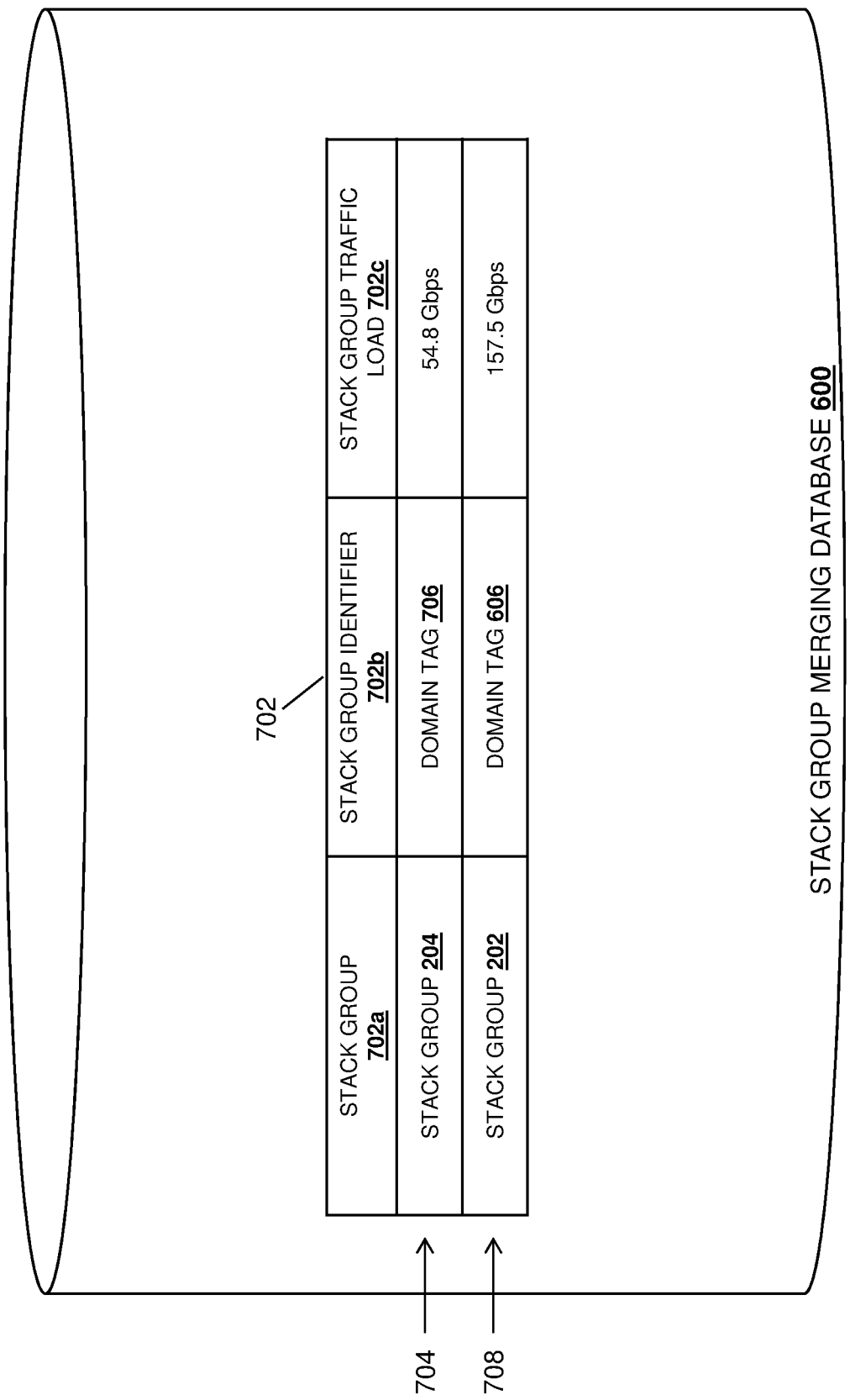
FIG. 10 is a schematic view illustrating an embodiment of a stack group merging database that may be provided during the method of FIG. 4.

As such, at block 408, the stack group merging engine 304 in the master stack device 204*a*/300 may receive the stack group merging communication 904 via its communication system 308 from the master stack device 202*a*. With reference to FIG. 10, following the receiving of the stack group merging communication 904, the stack group merging engine 304 in the master stack device 204*a*/300 may provide a row 708 in the stack group merging table 702 in its stack group merging database 308/700 that identifies the stack group 202 in the stack group column 702*a*, that includes a domain tag 606 in the stack group identifier column 702*b* that was included in the stack group merging communication 904, and that identifies the total data traffic amount transmitted by the stack group 202 over the time period that was included in the stack group merging communication 904 in the stack group traffic load column 702*c* (e.g., "157.5 Gbps" in the illustrated example.)

Figure 11:
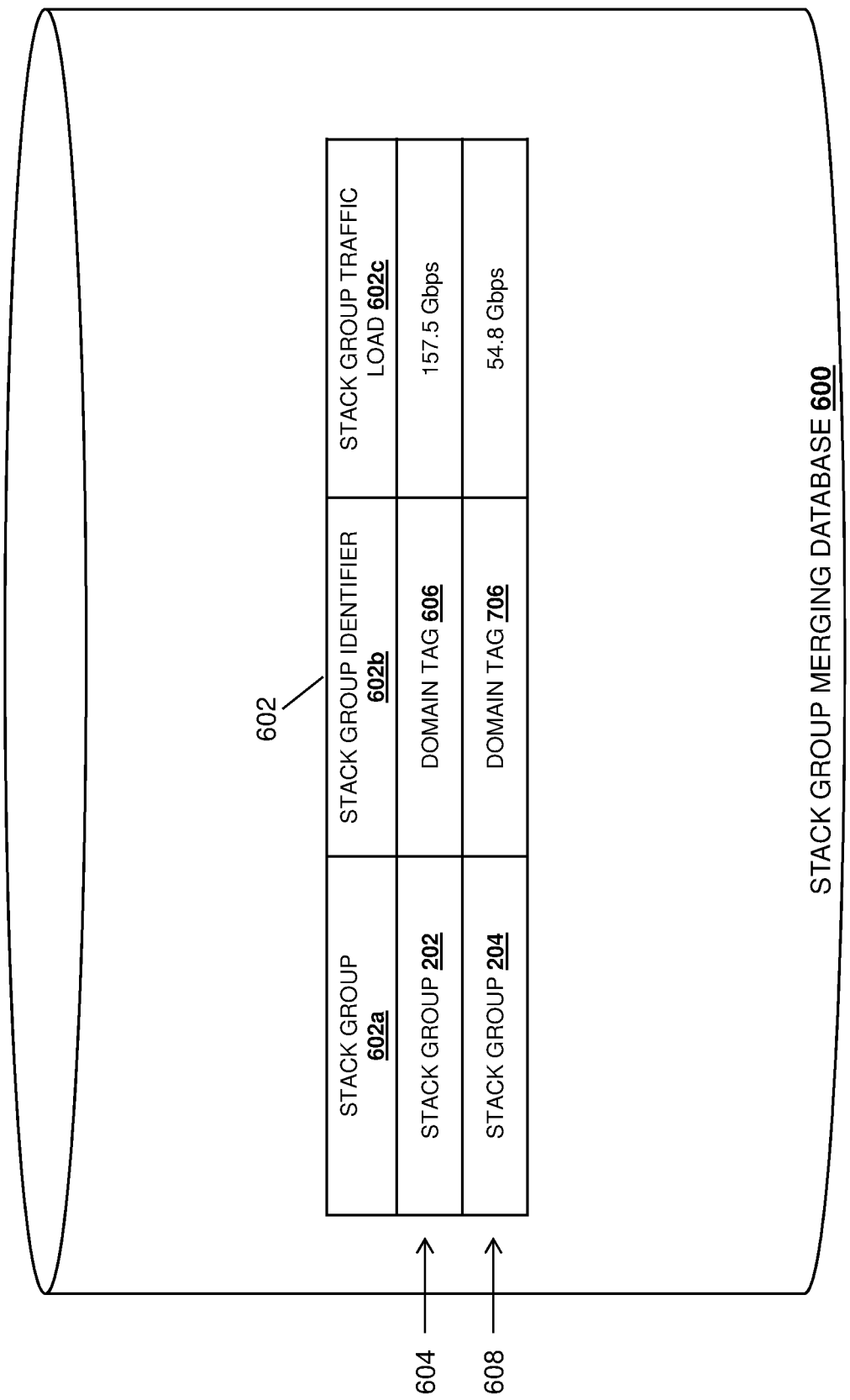
FIG. 11 is a schematic view illustrating an embodiment of a stack group merging database that may be provided during the method of FIG. 4.

With continued reference to FIG. 9, in response to receiving the stack group merging communication 904, the stack group merging engine 304 in the master stack device 204*a*/300 may operate to transmit a stack group merging communication 906 via its communication system 308 to the master stack device 202*a*, with that stack group merging communication 906 including the domain identifier for its stack group 204, traffic information associated with the total data traffic amount transmitted by its stack group 204, and/or other stack group merging information that would be apparent to one of skill in the art in possession of the present disclosure. In a specific example, the stack group merging communication 906 may be a Topology Change Response Packet (TCRP), although other techniques for providing the stack group merging communication 904 will fall within the scope of the present disclosure as well. As such, at block 408, the stack group merging engine 304 in the master stack device 202*a*/300 may receive the stack group merging communication 906 via its communication system 308 from the master stack device 204*a*. With reference to FIG. 11, following the receiving of the stack group merging communication 906, the stack group merging engine 304 in the master stack device 202*a*/300 may provide a row 608 in the stack group merging table 602 in its stack group merging database 308/600 that identifies the stack group 204 in the stack group column 602*a*, that includes a domain tag 706 in the stack group identifier column 602*b* that was included in the stack group merging communication 906, and that identifies the total data traffic amount transmitted by the stack group 204 over the time period that was included in the stack group merging communication 906 in the stack group traffic load column 602*c* (e.g., "54.8 Gbps" in the illustrated example.)

The method 400 then proceeds to decision block 416 where it is determined whether the total data traffic amounts transmitted by the stack groups are equal. In an embodiment, at decision block 416, the stack group merging engine 304 in the master stack devices 202*a* and 204*a* may operate to determine whether the total data traffic amounts transmitted by the stack groups 202 and 204 are equal by comparing the total data traffic transmitted by its stack group to the total data traffic transmitted by the stack group including the other master stack device. For example, the stack group merging engine 304 in the master stack device 202*a*/300 may reference the stack group merging table 602 in its stack group merging database 308/600 to determine whether the stack groups 202 or 204 are transmitted equal data traffic amounts, and the stack group merging engine 304 in the master stack device 204*a*/300 may reference the stack group merging table 702 in its stack group merging database 308/700 to determine whether the stack groups 202 or 204 are transmitted equal data traffic amounts.

If, at decision block 416, it is determined that the total data traffic amounts transmitted by the stack groups are not equal, the method 400 proceeds to block 412 where a master stack device is designated as the master stack device for a merged stack group. In this embodiment of block 412, the stack groups 202 and 204 are transmitting different data traffic amounts and, in response, each of the stack group merging engines 304 in the master stack devices 202*a* and 204*a* will determine that the master stack device included in the stack group that is transmitting the higher data traffic amount should be elected as the master stack device of a merged stack group that includes the stack groups 202 and 204.

Continuing with the specific example provided above, the stack group 202 is transmitting a higher data traffic amount than the stack group 204 (i.e., "157.5 Gbps" vs. "54.8 Gbps"), and thus each of the stack group merging engines 304 in the master stack devices 202*a* and 204*a* will determine that the master stack device 202*a* should be elected as the master stack device of a merged stack group that includes the stack groups 202 and 204. As such, the stack group merging engine 304 in the master stack device 202*a*/300 will begin operating as the master stack device for a merged stack group that includes the stack groups 202 and 204, with the stack devices 204*a*-204*d* in the stack group 204 subsequently rebooting, merging with the stack group 202 (e.g., if the stack devices 202*a*-202*d* are numbered "0", "1", "2", and "3", the stack devices 204*a*-204*d* will be renumbered "4", "5", "6", and "7"), and being configured with the configuration of the stack group 202 (e.g., by the master stack device 202*a*.) As will be appreciated by one of skill in the art in possession of the present disclosure, the election of a master stack device for a merged stack group based on that master stack device belonging to the stack group that is transmitting the higher data traffic amount will ensure that less data traffic is disrupted due to the stack group merger than in some embodiments of conventional stack group merging systems.

If, at decision block 416, it is determined that the total data traffic amounts transmitted by the stack groups are equal, the method 400 proceeds to block 412 where a master stack device is designated as the master stack device for a merged stack group. In this embodiment of block 412, the priority values of the master stack devices 202a and 204a in the different stack groups 202 and 204 are the same, and each of those stack groups 202 and 204 is transmitting the same amount of data traffic and, as such, each of the stack group merging engines 304 in the master stack devices 202a and 204a will determine that the master stack device that includes the "higher" MAC address should be elected as the master stack device of a merged stack group that includes the stack groups 202 and 204.

For example, the master stack device 202a may utilize a MAC address that may be characterized as "higher" than a MAC address utilized by the master stack device 204a, and thus each of the stack group merging engines 304 in the master stack devices 202a and 204a will determine that the master stack device 202a should be elected as the master stack device of a merged stack group that includes the stack groups 202 and 204. As such, the stack group merging engine 304 in the master stack device 202a/300 will begin operating as the master stack device for a merged stack group that includes the stack groups 202 and 204, with the stack devices 204a-204d in the stack group 204 subsequently rebooting, merging with the stack group 202 (e.g., if the stack devices 202a-202d are numbered "0", "1", "2", and "3", the stack devices 204a-204d will be renumbered "4", "5", "6", and "7"), and being configured with the configuration of the stack group 202 (e.g., by the master stack device 202a.) As will be appreciated by one of skill in the art in possession of the present disclosure, the use of MAC addresses to elect a master stack device for a merged stack group from respective master stack devices in the respective stack groups being merged is a conventional operation, and thus this embodiment of block 412 may include other conventional MAC-address-based master stack device election operations that would be apparent to one of skill in the art in possession of the present disclosure.

As will be appreciated by one of skill in the art in possession of the present disclosure, subsequent to any of the embodiments of block 412 of the method 400 discussed above, the merged stack group including the stack groups 202 and 204 may operate to transmit data traffic. Furthermore, as discussed above, the reconfiguration of one of the stack groups with the configuration of the other stack group (e.g., the reconfiguration of the stack group 204 with the configuration of the stack group 202 in the examples provided above) may require further reconfiguration operations by a user or administrator of the stack group merging system 200 so that the merged stack group may properly transmit data traffic that was previously transmitted by the stack group 204. However, as discussed above, the election of the master stack device 202a as the master stack device for the merged stack group will ensure that such reconfigurations of the stack group 204 will affect the transmission of a relatively lower data traffic amount.

Thus, systems and methods have been described that provide for the merging of stack groups based on which stack group was transmitted the higher amount of data traffic prior to the merging. For example, a first stack group may include a first master stack unit and slave stack unit(s), with the first master stack unit identifying respective first data traffic amounts transmitted by itself and the slave stack unit(s), and using those respective first data traffic amounts to determine a first total data traffic amount transmitted by the first stack group. The first master stack device may then transmit a first stack merging communication that identifies the first total data traffic amount to a second stack master unit that is included in a second stack group with second slave stack unit(s). The second stack master unit may also identify respective second data traffic amounts transmitted by itself and the second slave stack unit(s), and use those respective second data traffic amounts to determine a second total data traffic amount transmitted by the second stack group. Upon receiving the first stack merging communication that identifies the first total data traffic amount from the first master stack unit, the second master stack unit may determine that the second total data traffic amount is greater than the first total data traffic amount and, in response, operate as a master stack unit for a merged stack group that includes the first stack group and the second stack group. As such, the merging of stack groups may include the election of a master stack unit from the one of those stacks groups that was previously transmitting the higher amount of data traffic, thus providing the merged stack group the configuration of the stack group that was previously transmitting the higher amount of data traffic, and assuring that any interruption in the transmission of data traffic due to the need to reconfigure a stack group will occur to a relatively lower amount of data traffic.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A stack group merging system, comprising:
 a first stack group including a first master stack device and at least one first slave stack device, wherein the first master stack device is configured to:
  identify respective first data traffic amounts transmitted by each of the first master stack device and the at least one first slave stack device;
  determine, using the respective first data traffic amounts, a first total data traffic amount transmitted by the first stack group; and
  transmit a first stack merging communication that identifies the first total data traffic amount; and
 a second stack group including a second master stack device and at least one second slave stack device, wherein the second master stack device is coupled to the first master stack device and is configured to:
  identify respective second data traffic amounts transmitted by each of the second master stack device and the at least one second slave stack device;
  determine, using the respective second data traffic amounts, a second total data traffic amount transmitted by the second stack group;
  receive, from the first master stack device, the first stack merging communication that identifies the first total data traffic amount; and
  determine that the second total data traffic amount is greater than the first total data traffic amount and, in response, operate as a master stack device for a merged stack group that includes the first stack group and the second stack group.

2. The system of claim 1, wherein the first master stack device is configured to:
- transmit, prior to transmitting the first stack merging communication, a second stack merging communication that identifies a first priority value assigned to the first master stack device, and wherein the second master stack device is configured to:
  - receive, from the first master stack device, the second stack merging communication that identifies the first priority value assigned to the first master stack device; and
  - determine that the first priority value is equal to a second priority value assigned to the second master stack device and, in response, determine that the second total data traffic amount is greater than the first total data traffic amount.

3. The system of claim 1, wherein the identifying the respective first data traffic amounts transmitted by each of the first master stack device and the at least one first slave stack device includes:
- identifying respective maximum data traffic amounts transmitted on each port included on each of the first master stack device and the at least one first slave stack device, and wherein the identifying the respective second data traffic amounts transmitted by each of the second master stack device and the at least one second slave stack device includes:
  - identifying respective maximum data traffic amounts transmitted on each port included on each of the second master stack device and the at least one second slave stack device.

4. The system of claim 1, wherein the second master stack device is configured to:
- transmit, to the first master stack device, a second stack merging communication that identifies the second total data traffic amount.

5. The system of claim 1, wherein the second master stack device is configured to
- associate, in a database, the first total data traffic amount with a first stack group identifier for the first stack group.

6. The system of claim 4, wherein the second master stack device is configured to
- store, in the database, the second total data traffic amount with a second stack group identifier for the second stack group.

7. An Information Handling System (IHS), comprising:
- a communications system;
- a processing system that is coupled to the communications system; and
- a memory system that is coupled to the processing system and that includes instructions that, when executed by the processing system, cause the processing system to provide a stack group merging engine that is configured to:
  - identify respective first data traffic amounts transmitted via the communications system and by at least one first slave stack device that is coupled to the communications system;
  - determine, using the respective first data traffic amounts, a first total data traffic amount transmitted by a first stack group;
  - receive, from a second master stack device in a second stack group, a first stack merging communication that identifies a second total data traffic amount transmitted by the second stack group; and
  - determine that the first total data traffic amount is greater than the second total data traffic amount and, in response, operate as a master stack device for a merged stack group that includes the first stack group and the second stack group.

8. The IHS of claim 7, wherein the stack group merging engine is configured to:
- receive, from the second master stack device, a second stack merging communication that identifies the second priority value assigned to the second master stack device; and
- determine that the second priority value is equal to a first priority value associated with the stack group merging engine and, in response, determine that the first total data traffic amount is greater than the second total data traffic amount.

9. The IHS of claim 7, wherein the identifying the respective first data traffic amounts transmitted via the communications system and by the at least one first slave stack device that is coupled to the communications system includes:
- identifying respective maximum data traffic amounts transmitted on each port included on each of the communications system and the at least one first slave stack device that is coupled to the communications system.

10. The IHS of claim 7, wherein the stack group merging engine is configured to:
- transmit, to the second master stack device, a second stack merging communication that identifies the first total data traffic amount.

11. The IHS of claim 7, wherein the stack group merging engine is configured to:
- associate, in a database, the second total data traffic amount with a second stack group identifier for the second stack group.

12. The IHS of claim 11, wherein the stack group merging engine is configured to:
- store, in the database, the first total data traffic amount with a first stack group identifier for the first stack group.

13. The IHS of claim 7, wherein the first stack merging communication is provided in a Topology Change Notification Packet (TCNP).

14. A method for merging stack groups, comprising:
- identifying, by a first master stack device in a first stack group, respective first data traffic amounts transmitted by the first master stack device and at least one first slave stack device that is included in the first stack group;
- determining, by the first master stack device using the respective first data traffic amounts, a first total data traffic amount transmitted by the first stack group;
- receiving, by the first master stack device from a second master stack device in a second stack group, a first stack merging communication that identifies a second total data traffic amount transmitted by the second stack group; and
- determining, by the first master stack device, that the first total data traffic amount is greater than the second total data traffic amount and, in response, operating as a master stack device for a merged stack group that includes the first stack group and the second stack group.

15. The method of claim 14, further comprising:
receiving, by the first master stack device from the second master stack device, a second stack merging communication that identifies the second priority value assigned to the second master stack device; and determining, by the first master stack device, that the second priority value is equal to a first priority value associated with the first master stack device and, in response, determining that the first total data traffic amount is greater than the second total data traffic amount.

16. The method of claim 14, wherein the identifying the respective first data traffic amounts transmitted by the first master stack device and the at least one first slave stack device includes:

identifying respective maximum data traffic amounts transmitted on each port included on each of the first master stack device and the at least one first slave stack device.

17. The method of claim 14, further comprising:

transmitting, by the first master stack device to the second master stack device, a second stack merging communication that identifies the first total data traffic amount.

18. The method of claim 14, further comprising:

associating, by the first master stack device in a database, the second total data traffic amount with a second stack group identifier for the second stack group.

19. The method of claim 18 further comprising:

storing, by the first master stack device in the database, the first total data traffic amount with a first stack group identifier for the first stack group.

20. The method of claim 14, wherein the first stack merging communication is provided in a Topology Change Notification Packet (TCNP).

* * * * *